(12) United States Patent
Goller et al.

(10) Patent No.: US 7,172,723 B2
(45) Date of Patent: Feb. 6, 2007

(54) METHOD OF PRODUCING A SHAPED COMPOSITE MATERIAL

(75) Inventors: Ralf Siegfried Goller, Bergamo (IT); Giovanni Paolo Pacchiana, Locate (IT)

(73) Assignee: Freni Brembo S.p.A., Curno (IL)

( * ) Notice: Subject to any disclaimer, the term of this patent is extended or adjusted under 35 U.S.C. 154(b) by 147 days.

(21) Appl. No.: 10/181,672

(22) PCT Filed: Jan. 29, 2001

(86) PCT No.: PCT/EP01/00921

§ 371 (c)(1),
(2), (4) Date: Nov. 12, 2002

(87) PCT Pub. No.: WO01/59322

PCT Pub. Date: Aug. 16, 2001

(65) Prior Publication Data

US 2003/0141153 A1 Jul. 31, 2003

(30) Foreign Application Priority Data

Feb. 9, 2000 (EP) .................................. 00830093

(51) Int. Cl.
*B28B 13/00* (2006.01)
*F16D 65/10* (2006.01)
(52) U.S. Cl. ...................... 264/640; 264/29.1; 264/29.7
(58) Field of Classification Search ............... 264/29.1, 264/29.2, 29.5, 29.7, 640, 109, 118, 241; 427/667; 428/408
See application file for complete search history.

(56) References Cited

U.S. PATENT DOCUMENTS

| 3,552,533 | A |   | 1/1971  | Solon et al. |
| 3,712,428 | A |   | 1/1973  | Marin |
| 3,991,248 | A |   | 11/1976 | Bauer |
| 4,457,967 | A |   | 7/1984  | Chareire et al. |
| 5,147,588 | A | * | 9/1992  | Okura et al. ................. 273/239 |
| 5,360,587 | A | * | 11/1994 | Brotz et al. .................. 264/123 |
| 5,552,352 | A | * | 9/1996  | Brun et al. ..................... 501/88 |
| 5,654,059 | A | * | 8/1997  | Hecht ......................... 428/65.9 |
| 6,030,913 | A | * | 2/2000  | Heine et al. ................... 501/88 |
| 6,042,935 | A | * | 3/2000  | Krenkel et al. ........... 428/307.7 |
| 6,231,791 | B1| * | 5/2001  | Heine et al. ................ 264/29.5 |
| 6,802,403 | B2| * | 10/2004 | Goller et al. ........... 188/251 M |
| 6,818,288 | B2| * | 11/2004 | Bauer et al. .............. 428/293.4 |
| 6,824,862 | B2| * | 11/2004 | Bauer et al. .............. 428/293.4 |
| 6,838,162 | B1| * | 1/2005  | Gruber et al. ............ 428/293.4 |
| 2003/0057040 | A1 | * | 3/2003 | Bauer et al. ............. 188/251 A |
| 2003/0141153 | A1 | * | 7/2003 | Goller et al. .......... 188/218 XL |
| 2003/0146059 | A1 | * | 8/2003 | Goller et al. .......... 188/218 XL |
| 2004/0126535 | A1 | * | 7/2004 | Sommer et al. ............ 428/66.2 |

FOREIGN PATENT DOCUMENTS

| DE | 44 38 456 A  | 5/1996 |
| DE | 197 11 829   | 9/1998 |
| EP | 0 835 853 A  | 4/1998 |
| FR | 2 065 134    | 7/1971 |

* cited by examiner

*Primary Examiner*—Steven P. Griffin
*Assistant Examiner*—Carlos Lopez
(74) *Attorney, Agent, or Firm*—Kenyon & Kenyon LLP

(57) ABSTRACT

A shaped composite material for braking applications can be produced by a method comprising the steps of: a) providing a mixture comprising bundles of filaments constituted substantially by carbon and having lengths no greater than 30 mm and an organic binder in a mould of the said shape and, at the same time, incorporating in the mixture a plurality of reinforcing fibres which extend along the shape in a manner such as to prevent the propagation of cracks, b) forming the mixture comprising the reinforcing fibres to produce a semi-finished product, c) subjecting the semi-finished product to a first firing at a temperature such as substantially to bring about pyrolysis of the organic binder and to a second firing in the presence of silicon.

22 Claims, No Drawings

METHOD OF PRODUCING A SHAPED COMPOSITE MATERIAL

In general, the present invention relates to a shaped composite material for braking applications and to a method for the preparation thereof.

In particular, the present invention relates to a shaped composite material which can be produced by causing a mixture comprising bundles of filaments constituted substantially by carbon to interact with silicon at a temperature high enough to bring about fusion of the silicon.

The term "filaments constituted substantially by carbon" is intended to include fibrous materials produced by pyrolysis of various products of synthetic origin, for example, polyacrylonitrile (PAN) or polysilazane, or of natural origin, for example, pitches or cellulose-based natural sources such as vegetable fibres and wood.

The term "bundles of filaments" is intended to include groups of filaments variable from 3000 to 50000 units and having diameters of between 2 and 3 m, associated with one another and impregnated with a resin, for example, polyurethane resin.

The bundles are then broken up so as to have lengths of less than 30 mm and, finally, are arranged randomly in the mixture.

These randomly-arranged bundles of filaments are commonly defined on the basis of the number of units constituting the bundle, for example, 3K, 10K, 50K, etc.

It is known to use composite ceramic materials in various applications which require good impact strength, compression strength and resistance to heat generated by friction, which characteristics cannot be ensured by purely ceramic materials because of their intrinsic fragility.

In particular, known composite ceramic materials for braking applications are produced by the interaction of silicon with a mixture comprising bundles of carbon filaments and additives at a temperature at which the silicon is in the fused state.

Bundles of filaments as defined above have been used widely during the preparation of the above-mentioned materials, since a composite material with acceptable cohesion characteristics is generally produced, with relatively low production costs.

According to the prior art, these composite materials can be prepared in the following manner: the bundles of filaments are mixed with an aggregating resin, pitches and other additives and the mixture is placed in a mould in which it is formed by heating and the application of a pressure to produce a shaped, semi-finished product.

The semi-finished product is then subjected to a first firing in a furnace at a temperature such as to bring about carbonization or pyrolysis of the resin.

As a result of this firing, the semi-finished product acquires a degree of porosity because of the loss of volatile material at the carbonization or pyrolysis temperatures.

The fired semi-finished product is then subjected to a second firing in the presence of silicon at a temperature such as to bring about fusion of the silicon and infiltration thereof into the pores of the semi-finished product.

The infiltration of the silicon increases the cohesion of the bundles of carbon filaments and, at the same time, the fused silicon reacts partially with the carbon of the semi-finished product in the conditions of the second firing, forming silicon carbides which have the effect of improving the cohesion characteristics of the material.

The composite ceramic material prepared by the method described above is often used in the production of brake and clutch components for vehicles, particularly for disk brakes, by virtue of its good characteristics of compression strength and resistance to the heat generated by friction, and to wear.

In spite of the above-mentioned good characteristics, the aforementioned composite ceramic material has the serious disadvantage that any cracks or fractures which may form in it as a result of thermal and/or compression stresses to which it is subjected in use, for example, as a braking element, tend to propagate rapidly throughout the structure of this material, bringing about its complete disintegration.

The use of the above-mentioned material in the production of vehicle disk brakes, for example as the braking band, thus clearly leads to considerable risks to the safety of the user of the brakes.

The technical problem upon which the present invention is based is that of providing a shaped composite material for braking applications which does not disintegrate owing to the presence therein of cracks or fractures due to thermal and/or compression stresses, so as to overcome the disadvantages mentioned above with reference to the prior art.

This problem is solved by a shaped composite material which can be produced by the interaction of silicon with a mixture comprising bundles of filaments constituted substantially by carbon, arranged randomly and having dimensions no greater than 30 mm, the interaction taking place at a temperature suitable for bringing about fusion of the silicon, characterized in that a plurality of reinforcing fibres is incorporated in the mixture and extends along the shape of the material in a manner such as to prevent the propagation of cracks.

The present invention is based on the surprising discovery that the incorporation of reinforcing fibres in a mixture comprising bundles of randomly-arranged filaments produces a shaped composite material which still has good cohesion characteristics whilst, at the same time, the reinforcing fibres can prevent the propagation of cracks through the entire shape when the material is in use.

The reinforcing fibres preferably extend in the structure of the composite material according to the invention, along its entire shape.

Alternatively, the reinforcing fibres may be provided only in some regions of the composite material, depending on the regions in which cracks arise and the regions of their propagation paths, both of which are predictable on the basis of structural calculations.

For example, in the case of an axially symmetrical structure such as a disk-brake disk, it is clear from structural calculations that the crack-propagation paths have the greatest probability of being arranged radially and that the cracks propagate from the inside of the disk towards the outside to the extent of causing the disk to explode.

On the basis of the inventive concept explained above, in the case of a disk-brake disk, the propagation of cracks is therefore prevented by arranging the reinforcing fibres around annular portions of the disk of increasing size.

It is important that the reinforcing fibres have satisfactory characteristics of cohesion to the other components of the composite material according to the invention to prevent the entire structure from disintegrating in use, even in the absence of cracks or fractures.

Moreover, the reinforcing fibres should be substantially inert in relation to the components of the composite material and should have an adequate ability to withstand the temperatures of pyrolysis and the infiltration of silicon in order to avoid their degradation during the preparation of the composite material according to the invention.

For this purpose, the material of the reinforcing fibres is preferably constituted by carbon fibres. It is, however, possible to use other materials such as SiC, $Si_3N_4$, and TiC, as well as metals, for example, platinum, which can withstand the temperatures of the interaction with silicon.

The reinforcing fibres may be incorporated in the material according to the invention in various ways. For example, the reinforcing fibres may be disposed in a plurality of bundles which are arranged in predefined directions.

These directions may be warp and weft directions, the bundles forming a fabric.

Alternatively, several bundles of reinforcing fibres combined or twisted together form a single warp or weft thread to form the fabric.

Alternatively, the reinforcing fibres may constitute a non-woven fabric, for example, a felt.

The reinforcing fibres may also constitute one or more layers within the material according to the invention.

The quantities of the components of the shaped composite material according to the invention may vary, as percentages by volume relative to the volume of the material, as follows:
bundles of filaments 40–70%, preferably 50–06%,
binder 5–30%, preferably 15–25%,
additives 0.5–20%, preferably 1–15%.
reinforcing fibres 4–30%, preferably 10–20%.

The present invention also relates to a method of producing a shaped composite material, comprising the steps of:
a) mixing a predetermined quantity of bundles of filaments constituted substantially by carbon and having lengths no greater than 30 mm with a predetermined quantity of an organic binder to give a mixture,
b) placing the mixture in a mould of the said shape and simultaneously incorporating in the mixture a plurality of reinforcing fibres which extend along the shape in a manner such as to prevent the propagation of cracks,
c) forming the mixture including the reinforcing fibres to produce a semi-finished product,
d) subjecting the semi-finished product to a first firing at a temperature such as substantially to bring about carbonization or pyrolysis of the organic binder,
e) subjecting the fired, semi-finished product to a second firing, in the presence of silicon, at a temperature such as substantially to bring about fusion of the silicon and infiltration thereof into the semi-finished product to produce the shaped composite material.

In the method according to the invention, the bundles of filaments may have diameters of from 0.1 to 2 mm, preferably from 0.3 to 0.5 mm.

The quantity of bundles of filaments contained in the mixture may vary from 50% to 80% by volume, relative to the volume of the mixture, and is preferably within the range of 60%–70%.

The bundles of filaments and/or the reinforcing fibres may advantageously be coated beforehand with a protective resin, preferably polyurethane resin, before being used in accordance with the method of the invention.

Alternatively, the bundles of filaments and the reinforcing fibres may be coated beforehand with the same organic binder which is used to prepare the mixture.

Greater cohesion of the material and a more compact product are thus obtained.

During the first firing of the semi-finished product, the resin and the organic binder carbonize, creating a protective layer on the bundles of filaments and on the reinforcing fibres, preventing them from disintegrating or even dissolving during the subsequent treatment with silicon.

The bundles of filaments and the reinforcing fibres thus maintain their original shape throughout the process, so as to produce a material with good characteristics of cohesion and strength.

The organic binder is a conventional binder which may be selected from the group comprising phenolic and acrylic resins, paraffin, pitches, polystyrenes, etc.

The binder is preferably selected from the group comprising pitches and phenolic resins.

The binder may be added to the mixture in any desired form, for example, in the solid, semi-liquid or liquid state, or in solution.

For example, phenolic resin may be added in the form of pellets, powder or granules.

The quantity of organic binder in the mixture may vary from 5% to 30% by volume, relative to the volume of the mixture, and is preferably within the range of 20%–26%.

The mixture may also contain other conventional additives used as fillers and, indirectly, for regulating the porosity and the density of the desired composite material.

These additives are constituted by particles of inorganic materials such as, preferably, graphite, silicon carbide, or metal carbides or nitrides, in powder form.

The quantity of additives in the mixture may vary from 0.7% to 23% by volume, relative to the volume of the mixture, and is preferably within the range of 9%–15%.

The mixing may be performed in conventional manner and with conventional apparatus and the bundles of filaments will be arranged randomly in the various directions.

The reinforcing fibres may be incorporated in the mixture in various ways.

According to a preferred way of implementing the method according to the invention, the incorporation is performed by the steps of:
i) arranging a first layer of the mixture along the shape of the mould,
ii) adding, onto the first layer of mixture, the plurality of reinforcing fibres which extend along the shape in a manner such as to prevent the propagation of cracks,
iii) arranging a second layer of the mixture on the first layer so as to cover the plurality of reinforcing fibres completely.

The reinforcing fibres may be added to the mixture in the form of a plurality of bundles arranged in predefined directions.

These predefined directions may be warp and weft directions, so that the bundles form a fabric.

The fabric may comprise from 2 to 30 fibres per cm, preferably 5–8 fibres/cm.

Alternatively, the reinforcing fibres may form a non-woven fabric, for example, a felt.

The quantity of reinforcing fibres incorporated in the mixture depends on the required fibre content of the final composite material, this content being within the range of 4–30% by volume, relative to the volume of the material, preferably 10–20%.

Clearly, the above-described layering steps may be repeated a predetermined number of times so as to produce a multi-layered composite material in which each layer of reinforcing fibres is incorporated between two layers of mixture comprising bundles of filaments.

During the forming step of the method of the invention, the mixture comprising the reinforcing fibres is heated in the mould to a temperature of from 80° C. to 180° C., preferably 100–120° C., and a pressure of between 0.1 N/cm² and 5N/cm², preferably 0.5–1N/cm², is applied thereto.

The shaped and compacted semi-finished product thus obtained is removed from the mould and then subjected to a first firing so as to carbonize the organic binder (step d, pyrolysis).

This firing is performed in a conventional furnace at a temperature which depends substantially on the type of binder used and is generally within the range of 900–1200° C.

The firing is performed in the presence of a stream of inert gas such as nitrogen or argon and with an extra pressure of 10–100 mbars, preferably 20–30 mbars.

The stream also advantageously removes the gases which are liberated by the pyrolysis of the organic binder.

During this step of the method, the semi-finished product acquires a greater porosity, which is important in the subsequent firing since it allows the fused silicon to infiltrate therein.

According to one embodiment of the invention, the method may also comprise a step for finishing the surface of the semi-finished product produced by the first firing of step d).

This advantageously enables any surface deformations of the semi-finished product to be removed by conventional apparatus so as to give it the desired shape.

The finishing step is preferably performed dry, for example, by means of diamonds, since the semi-finished product which, after the first firing, has acquired a degree of porosity, might disadvantageously absorb liquid substances if the finishing were performed wet.

The semi-finished product, fired in accordance with step d), is subjected to a second firing in the presence of silicon (step e).

In order to perform the second firing, the semi-finished product, fired and possibly subjected to finishing, is inserted in the chamber of a container having a volume approximately twice that of the semi-finished product, the space formed between the semi-finished product and the container being filled with silicon, which surrounds the semi-finished product. The quantity of silicon used is therefore that which is required to fill the pores of the semi-finished product, or a little more.

Pure silicon or an alloy of silicon and aluminium or copper in granular or powder form is used to fill the space.

The chamber may be in communication with the exterior by means of suitable holes for the outlet of the gases liberated during the firing.

After the silicon has been loaded, the container is inserted in a suitable, conventional furnace, heated to a temperature of 1400–1700° C.

At these temperatures, the silicon melts and infiltrates the pores of the semi-finished product (silication).

The firing is performed under partial vacuum, at a reduced pressure of from 900 mbars to 300 mbars, preferably from 800 to 500 mbars.

Upon completion of the firing, the composite material is cooled, for example, with argon or, preferably, with nitrogen, so that the residual silicon solidifies in small spheres which are easy to recover from the container.

The composite material according to the invention thus produced may possibly be subjected to finishing operations, for example, surface finishing, which may be performed dry or wet, in conventional manner.

Clearly, the steps involving firing in a furnace, that is, the pyrolysis and silication steps, could take place in a single furnace, reducing production times and the complexity of the apparatus.

The composite material according to the invention may be shaped in various ways according to the final use.

In particular, the material according to the invention may advantageously be used in the production of components for vehicle brakes, particularly disk brakes.

In this application, the material may be shaped in the form of a braking ring or band for a disk to constitute the braking component of a disk brake, or may be fitted on a bell for supporting the braking band.

Moreover, the material may also be applied to the caliper body of a disk brake, as well as to the brake pad and can be shaped in a suitable manner for these applications.

The composite material according to the invention is distinguished by its optimal friction characteristics, hardness, bending strength, resistance to wear and to heat generated by friction, impact strength, and compression strength, which render it particularly suitable for use in braking applications.

However, the main advantage of the composite material according to the invention lies in the fact that it is very safe in use since any cracks or fractures which may arise in the material during use do not lead to complete disintegration of the structure since their propagation is prevented by the reinforcing fibres incorporated in the material.

A further advantage of the composite material according to the invention is that it can also be produced easily and economically without requiring substantial additional costs or particularly expensive tooling.

In fact, it should be noted that the composite material according to the invention can be produced by conventional techniques applied to the production of the corresponding known composite materials and, moreover, the quantity of reinforcing fibres added to the material is relatively low (no greater than 30% by volume).

The characteristics and the advantages of the present invention will become clearer from the following description of an example of the preparation of a shaped composite material according to the invention, the description being given by way of non-limiting example.

EXAMPLE

A mixture containing, as percentages by volume, relative to the volume of the mixture, 65% of bundles of carbon filaments having diameters of from 0.3 mm to 0.5 mm and lengths of from 5 mm to 10 mm, 23% of dry phenolic resin, and 12% of silicon carbide powder was prepared in a mixer known as an Erigh mixer, in conventional manner.

The mixing led to a random distribution of the bundles of filaments.

A portion of the mixture was then placed in the cavity of an annular mould with an inside diameter of 150 mm, an outside diameter of 335 mm and a height of 70 mm, so as to form a layer.

A ring-shaped fabric of carbon reinforcing fibres, prepared in conventional manner and having 6 fibres per cm, was applied to the layer of mixture. The reinforcing fibres of the fabric had diameters of from 0.3 mm to 0.5 mm, forming bundles of 3000 units or 3K, each impregnated with polyurethane.

The fabric was then covered with further mixture to fill the mould.

The mixture comprising the fabric was then shaped by heating the mould to a temperature of 1100° C. and applying a pressure of 1 N/cm², to produce a crude disk-shaped body.

After the crude disk had been removed from the mould, it was fired for a period of 12 hours in a furnace heated to a temperature of 1100° C.

The firing was performed at a pressure of 30 mbars and in an atmosphere which was inert owing to the presence of argon which was conveyed into the furnace at a flow-rate of 30 liters/minute.

After firing, the disk was subjected to dry finishing with diamonds, in conventional manner, to remove surface deformations.

At this point, the crude disk was placed in a container provided with gas-outlet holes.

The container was filled with the quantity of silicon, in granular form, required to fill the space formed between the disk and the container.

The container was then transferred to a furnace heated to a temperature of 1500° C. and was left in the furnace for a period of 8 hours.

The firing was performed at a reduced pressure of 700 mbars and was followed by cooling in the furnace with continuous blowing-in of nitrogen.

A disk of the composite material according to the invention was thus produced and, after cooling, was subjected to finishing with diamonds, in conventional manner, to remove surface deformations and to achieve the final shape with the desired precision and tolerances.

The composition of the composite material of the disk, as percentages by volume relative to the volume of the material, was as follows: 55% of bundles of filaments, 10% of additives, 15% of reinforcing fibres and 20% of products resulting from the carbonization of the binder.

The disk thus produced was tested as a component of a vehicle disk brake and was found to have optimal hardness characteristics, impact strength, wear resistance, compression strength and resistance to heat generated by friction during braking.

In particular, even when there were cracks in the disk, it did not disintegrate into pieces during continuous use, in contrast with what happened to disks of composite material prepared by the same method without the addition of fibres as reinforcement.

In order to satisfy contingent and specific requirements, an expert in the art may apply to the above-described preferred embodiment of the composite ceramic material many modifications, adaptations and replacements of elements with other functionally equivalent elements without, however, departing from the scope of the appended claims.

The invention claimed is:

1. A method of producing a shaped composite material, comprising the steps of:
   a) mixing a predetermined quantity of bundles of filaments constituted substantially by carbon and having lengths no greater than 30 mm with a predetermined quantity of an organic binder to give a mixture,
   b) placing the mixture in a mould of the said shape and simultaneously incorporating in the mixture a plurality of reinforcing fibres which extend along the shape in a manner such as to prevent the propagation of cracks,
   c) forming the mixture including the reinforcing fibres as recited in step b) to produce a semi-finished product,
   d) subjecting the semi-finished product to a first firing at a temperature such as substantially to bring about carbonization or pyrolysis of the organic binder,
   e) subjecting the fired, semi-finished product to a second firing in the presence of silicon at a temperature such as substantially to bring about fusion of the silicon and infiltration thereof into pores of the semi-finished product to produce the shaped composite material.

2. The method according to claim 1, in which the incorporation of the plurality of reinforcing fibres in the mixture comprises the steps of:
   i) arranging a first layer of the mixture along the shape of the mould, and
   ii) adding, onto the first layer of the mixture, the plurality of reinforcing fibres which extend along the shape in a manner such as to prevent the propagation of cracks.

3. The method according to claim 2, in which the incorporation of the plurality of reinforcing fibres in the mixture comprises the step of:
   iii) arranging a second layer of the mixture on the first layer so as to cover the plurality of reinforcing fibres completely.

4. The method according to claim 1, in which the plurality of reinforcing fibres is incorporated in the mixture in the form of a plurality of bundles arranged in predefined directions.

5. The method according to claim 4, in which the predefined directions are warp and weft directions, and in which the bundles form a fabric.

6. The method according to claim 1, in which the plurality of reinforcing fibres is incorporated in the mixture in the form of a non-woven fabric.

7. The method according to claim 1, in which the organic binder is a dry powder organic binder.

8. The method according to claim 1, in which the reinforcing fibres extend along the entire shape of the mould.

9. The method according to claim 1, in which the reinforcing fibres are incorporated as an annular portion in the mixture.

10. The method according to claim 1, in which the bundles of filaments are randomly arranged in the mixture.

11. The method according to claim 1, in which the bundles of filaments and/or the reinforcing fibres are coated with a resin.

12. The method according to claim 11, in which the resin is constituted by polyurethane resin.

13. The method according to claim 1, in which the quantity of bundles of filaments in the mixture is within the range of 50–80% by volume, relative to the volume of the mixture.

14. The method according to claim 1, in which the quantity of organic binder in the mixture is within the range of 5–30% by volume, relative to the volume of the mixture.

15. The method according to claim 1, in which the mixture further comprises from 0.7% to 23% by volume, relative to the volume of the mixture, of additives selected from the group comprising graphite, silicon carbide, and metal carbides and nitrides, in powder form.

16. The method according to claim 1, in which the reinforcing fibres are selected from the group comprising carbon fibres and metal fibres.

17. The method according to claim 16, in which the quantity of reinforcing fibres incorporated in the mixture is within the range of 10–30% by volume, relative to the volume of the material.

18. The method according to claim 1, in which the forming step is performed at a temperature of 80–180° C.

with the application of a pressure of 0.1–5 N/cm<2> to the mixture comprising the reinforcing fibres.

19. The method according to claim 1, in which the first firing of the semi-finished product is performed at a temperature of 900–1200° C. in the presence of an inert gas.

20. The method according to claim 1, in which the second firing of the semi-finished product is performed in the presence of an inert gas, at a temperature of 1400–1700° C. and under partial vacuum with a reduced pressure of from 300 to 900 mbars.

21. The method according to claim 1, further comprising a step for dry finishing of the semi-finished product, performed after the first firing of step d) and before the second firing of step e).

22. The method according to claim 1, further comprising a step for dry or wet finishing of the semi-finished product, performed after the second firing of step e).

* * * * *